United States Patent [19]

Döring

[11] 4,242,688

[45] Dec. 30, 1980

[54] INK JET PRINTER

[75] Inventor: Michael Döring, Hamburg, Fed. Rep. of Germany

[73] Assignee: U.S. Philips Corporation, New York, N.Y.

[21] Appl. No.: 87,619

[22] Filed: Oct. 23, 1979

[30] Foreign Application Priority Data

Oct. 27, 1978 [DE] Fed. Rep. of Germany ....... 2846844

[51] Int. Cl.[3] ............................................ G01D 15/18

[52] U.S. Cl. .................................. 346/75; 346/140 R

[58] Field of Search .............................. 346/75, 140 R

[56] References Cited

U.S. PATENT DOCUMENTS 3,769,624 10/1973 Lee et al. ........................... 346/75 X 3,893,623 7/1975 Toupin .............................. 346/75 X 4,138,686 2/1979 Graf ...................................... 346/75

*Primary Examiner*—George H. Miller, Jr.

*Attorney, Agent, or Firm*—Robert S. Smith

[57] ABSTRACT

An ink jet printer comprising one or more nozzles which are connected, via a pressure chamber, to an ink supply duct. The pressure chamber comprises a wall which can be moved by means of an electromechanical converter in order to realize droplet-like ejection of ink from the nozzle. The converter continuously vibrates during operation. In front of each nozzle there is arranged a brake electrode which can be connected to a voltage as desired. When the voltage is switched off, the ejected ink droplet is incident on the record carrier, and when the voltage is switched on, the ink droplet is intercepted by the brake electrode and is withdrawn into the nozzle by the converter. Special interceptors for the ejected ink and deflection devices are no longer required.

7 Claims, 8 Drawing Figures

INK JET PRINTER

The invention relates to an ink jet printer, comprising at least one nozzle which is connected, via a pressure chamber, to an ink supply duct, said pressure chamber comprising a wall which can be moved, by means of an electromechanical converter, in order to realize droplet-like ejection of ink from the nozzle.

In customary ink jet printers the ink is ejected under pressure from a nozzle and the ink jet is subdivided into droplets. Subsequently, the ink droplets are selectively electrostatically charged and deflected in a deflection electrode device in accordance with the character to be printed. A printing method of this kind requires only one nozzle. Ink droplets which are not necessary for printing a character are deflected by the deflection device so far that they are not incident on the record carrier but are intercepted by a separate interceptor. This superfluous ink can either be disposed of or can be supplied to the printer again after having been subjected to an expensive preparation method. An ink jet printer of this kind is known from German Auslegeschrift No. 24 28 460.

It is also known to realize the droplet-like ejection of the ink from the nozzle by means of a separate converter which is arranged in the ink ejection device of the printer between the ink supply duct and the ejection nozzle. The converter is activated when ink ejection is required for printing. Ink jet printers of this kind are known from German Offenlegungsschrift No. 23 23 335 and German Auslegeschrift No. 24 47 843. For the printing of a complete character, either the ejected ink droplet can be electrostatically charged and subsequently deflected by a separate deflection electrode device, or a separate ink ejection device with nozzle, converter and ink supply duct can be associated with each feasible printing point of the mosaic-like character.

Both said methods require an expensive ink ejection device for the printing of the character and also require a comparatively great amount of time for printing a character.

The invention has for its object to provide an ink jet printer in which the drawbacks of the known methods are mitigated and in which ink is ejected only when it is actually required for printing, the cost of the device also being minimized.

To this end, the ink jet printer in accordance with the invention is characterized in that the converter is adapted to vibrate continuously during operation, a brake electrode being arranged just in front of the nozzle aperture, it being possible to apply a voltage to said brake electrode as desired, the arrangement being such that when the voltage is switched off, a droplet is ejected, whilst when the voltage is switched on, the emerging droplet is intercepted, braked and withdrawn into the nozzle. Preferably, the converter has associated with it a first pulse generator, a second pulse generator which can be controlled in dependence of the first pulse generator being associated with the brake electrode. It can thus be achieved that the electrode is connected to the voltage only for the duration of the ink ejection.

An important aspect of the invention consists in that as a result of the electrostatic charging and deflection of an emerging ink droplet which is not required for printing, the droplet is brought into contact with a fixed structure so that, due to the surface stress of the droplet, the droplet is braked and droplet ejection is prevented, without the ink liquid being interrupted. When the brake electrode is suitably arranged, the coherent ink jet is returned by the surface tension during the return movement of the converter and of the ink present in the ink ejection device.

The invention not only offers a simple construction of an ink ejection device for an ink jet printer, but also enables simple control of the ink ejection. Because the converter continuously operates during printing, the ink at the exit of the nozzle is continuously kept in motion, so that the nozzle is not clogged, not even if no ink ejection takes place for a prolonged period of time. Therefore, no special construction of the nozzle is required to prevent unintended escaping of the ink, as opposed to a known device described in German Auslegeschrift 24 18 093.

Furthermore, in accordance with the invention electrostatic interaction of the ejected ink droplets is avoided, because these droplets are electrically neutral. Therefore, cheaper kinds of ink can be used. When the converter is suitably proportioned, it can be operated at its resonant frequency, so that high printing frequencies can be realized.

These advantages become significant notably when the ink ejection device is provided with more than one nozzle. Because only one converter is then required, the nozzles may be arranged very near to and/or one above the other, so that a high printing speed and a high printing quality of the mosaic-shaped character is obtained.

Some embodiments in accordance with the invention will be described in detail hereinafter with reference to the accompanying diagrammatic drawing.

Figure 4:
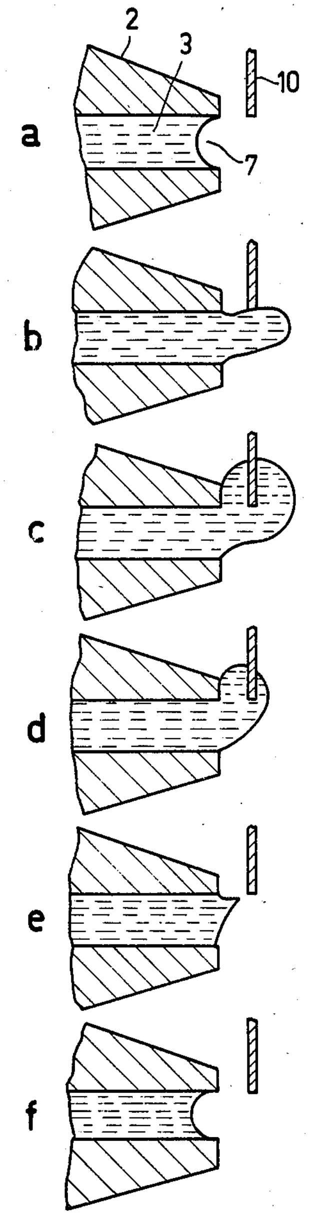
Figure 5:
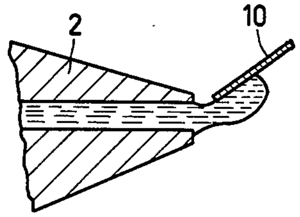
Figure 6:
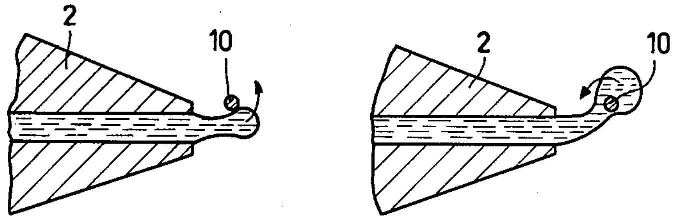
Figure 7:
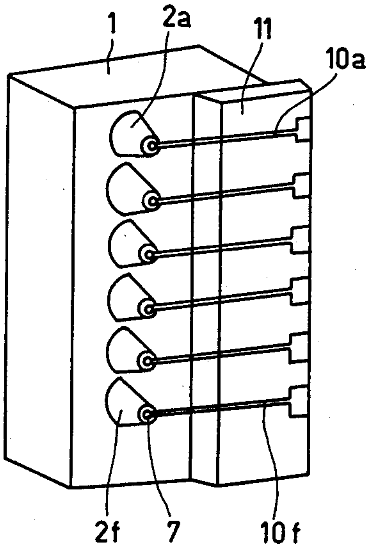
Figure 8:
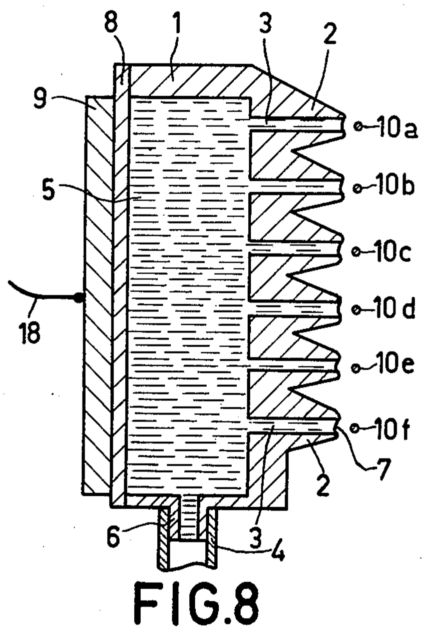

FIG. 4 illustrates the behaviour of an ink droplet when voltage is applied to the brake electrode, FIG. 5 shows the behaviour of an ink droplet in the case of a flat brake electrode when a voltage is applied thereto, FIG. 6 illustrates the behaviour of an ink droplet in the case of a wire-shaped brake electrode when a voltage is applied thereto, FIG. 7 is a perspective view of an ink ejection device comprising more than one nozzle, and FIG. 8 is a side elevation, in a sectional view, of the device shown in FIG. 7.

Figure 1:
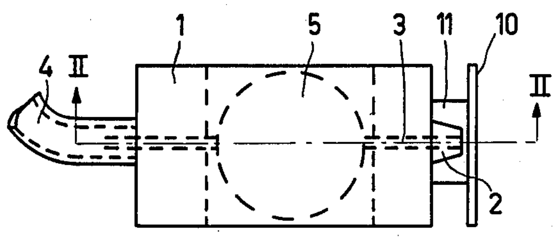
FIG. 1 is a plan view of an ink ejection device of an ink jet printer.
Figure 2:
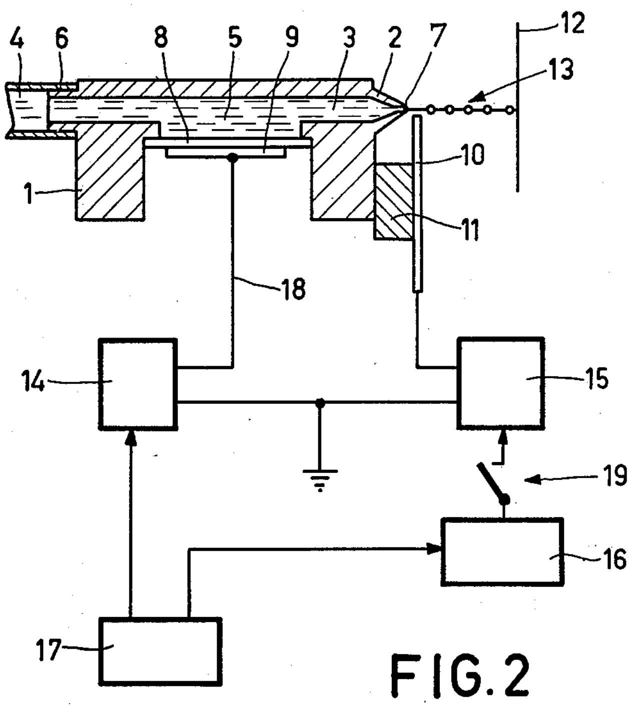
FIG. 2 is a side elevation , in a sectional view, of the device shown in FIG. 1, together with a block diagram of a control circuit.

The FIGS. 1 and 2 refer to an ink ejection device, only the parts thereof which are necessary for a proper understanding of the invention being shown. For example, the ink reservoir, the device for moving the ink ejection device and the printing anvil have been omitted.

The ink ejection device shown in the FIGS. 1 and 2 consists of a housing 1 which accommodates a pressure chamber 5 and an ink duct 3. A tube which acts as an ink supply duct 4 is connected to a connection pipe 6, said tube being connected to an ink reservoir (not shown) in known manner. Opposite the connection pipe, the ink duct 3 changes over into a nozzle 2, the aperture 7 of which determines the size of the ink droplets 13 to be ejected. After ejection of an ink droplet 13, it travels in free flight from the nozzle aperture 7 to a record carrier 12 in order to form a point of the character to be printed.

The lower side of the pressure chamber 5 is scaled by a diaphragm 8 which forms a movable wall which can be made to vibrate by means of an electromechanical converter 9. The converter 9 is connected, via an amplifier 14, to a first pulse generator 17 and continuously vibrates during printing under the influence of this pulse generator 17. When a piezo-ceramic converter is used, the chosen pulse frequency of the pulse generator 17 may be comparatively high. When the first pulse generator 17 applies a voltage to the converter 9, a pressure is exerted on the ink present in the pressure chamber 5, the resultant pressure wave in the nozzle 2 causing ejection of an ink droplet 13.

In the vicinity of the nozzle aperture 7 there is arranged a brake electrode 10 which is connected to the housing 1 by way of an electrode holder 11. It is thus ensured that the end of the brake electrode 10 is always situated at the same distance from the nozzle aperture 7. The brake electrode 10 may be shaped as a plate or a wire. Alternatively, the brake electrode 10 may be provided as a printed conductor on an insulation substrate. Using a second pulse generator 16, a voltage can be applied to the brake electrode 10 as desired, via an amplifier 15. This supply of a voltage as desired is symbolically denoted by the switch 19 in FIG. 2. Instead of the switch, use can also be made of an electronic switching device. Moreover, the switch 19 can be integrated in the first pulse generator 17 or in the second pulse generator 16.

The ejection of droplets from the mozzle 2 is achieved in that the converter 9 exerts a pressure on the ink in the ink duct 3. As a result, the ink is ejected from the nozzle aperture 7. Briefly thereafter, the converter 9 exerts a pull on the ink present in the ink duct 3, so that the ink present in the nozzle aperture 7 is withdrawn. This push-pull movement in the ink duct 3 results in droplet-like ejection from the nozzle aperture 7. When this ejection is to be interrupted, a voltage is applied to the brake electrode 10 at a suitable instant. Preferably, this is the instant at which the converter starts to exert a pressure on the ink in the ink duct 3. The voltage remains present on the brake electrode for as long as the ink ejection has to be interrupted. The voltage on the brake electrode 10 is preferably switched off at the instant at which the converter 9 starts to exert a pull on the ink in the ink duct 3. In order to simplify the circuit, the second pulse generator 16 can be switched in synchronism with the first pulse generator 17, so that when a pulse voltage is applied to the converter 9, a pulse voltage is at the same time applied to the brake electrode 10, the pulse intervals in the two pulse generators also being synchronized. The switch 19 then only enables the printing operation, that is to say the ejection of ink, by opening the control line between the second pulse generator 16 and the amplifier 15.

Figure 3:
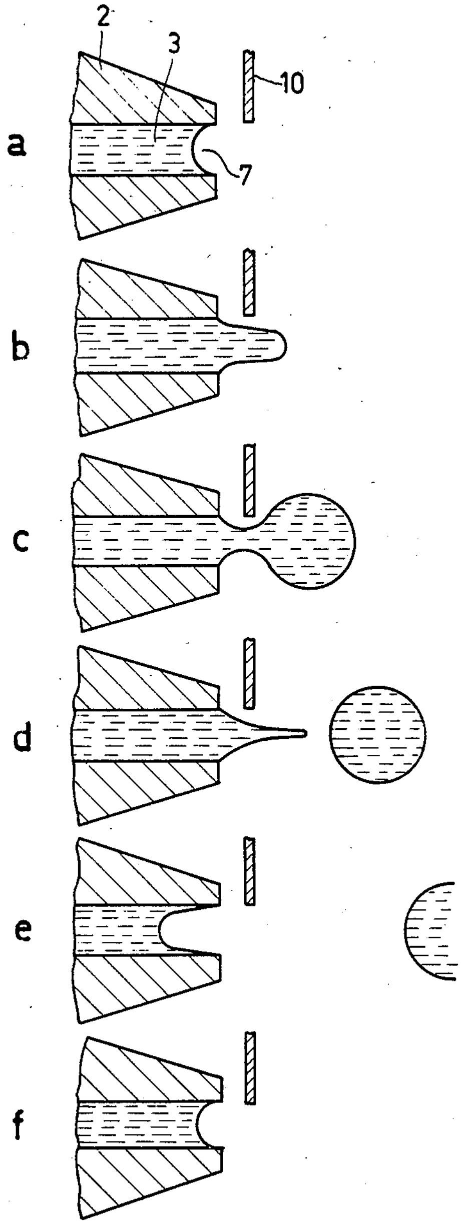
FIG. 3 illustrates the behaviour of an ink droplet when no voltage is applied to the brake electrode.

The FIGS. 3 and 4 show the behaviour of the ink during a push and pull period of the converter 9, once with the brake electrode 10 deactivated (FIG. 3) and once when a voltage is applied to the brake electrode 10 (FIG. 4). In the rest condition, the ink at the area of the nozzle aperture 7 is curved slightly inwards due to the surface tension. When the first pulse generator 17 applies a pulse voltage to the converter 9, the converter 9 exerts a pressure on the ink which thus starts to emerge from the nozzle aperture 7 (b in FIG. 3). When a sufficient amount of liquid for forming an ink droplet has emerged from the nozzle aperture (c in FIG. 3), the pulse voltage from the first pulse generator 17 is switched off again. The converter 9 then exerts a pull on the ink, so that the ink is withdrawn into the ink duct 3. The emerged ink droplet is torn off (d in FIG. 3) and reaches the record carrier 12 in free flight. The overshoot of the converter beyond its rest position causes a comparatively strong pull on the ink, so that it is withdrawn far into the nozzle aperture 7 (e in FIG. 3). As soon as the converter 9 reaches its rest position after the overshoot, the ink in the ink duct 3 assumes the starting position again (f in FIG. 3).

When a voltage is applied to the brake electrode 10, preferably simultaneously with the voltage to the converter 9, the ink ejected by the pressure is deflected and intercepted by the brake electrode 10 during the ejection still (b and c in FIG. 4). The ink then contacts the brake electrode 10. As a result, the ink is braked so that no ink droplet is released (c in FIG. 4). During the return movement of the ink due to the pull exerted by the converter 9, the ink adhering to the brake electrode 10 is withdrawn into the nozzle 2 (d in FIG. 4), no residual liquid remaining between the nozzle 2 and the brake electrode 10 (e in FIG. 4). When the voltage on the brake electrode is interrupted before the next ejection of ink, the next ink droplet can be ejected in an unobstructed manner. The views a to f given in the FIGS. 3 and 4 relate to the same instant.

A brake electrode device of this kind enables arbitrary control of the ink droplet succession with a predetermined basic frequency.

In the FIGS. 3 and 4, the brake electrode 10 is arranged perpendicularly to the direction of ink ejection. Other electrode shapes are also possible. For example, it may be arranged at an angle with respect to the ejection direction as shown in FIG. 5. The brake electrode 10 may also be shaped as a wire electrode as shown in FIG. 6. The inclined arrangement of the brake electrode 10 as shown in FIG. 5 results in a higher stability of the ink return, even in the case of high ejection speeds (higher pulse frequency of the first pulse generator 17).

The wire-shaped brake electrode 10 shown in FIG. 6 is laterally guided beyond the nozzle aperture 7. This offers the advantage that length tolerances of the brake electrode 10 do not have an effect. This is because, in order to achieve unobstructed ink ejection when the voltage is switched off, the brake electrode 10 may not intersect the prolongation of the cross-section of the nozzle aperture 7. In the nozzle device shown in FIGS. 3, 4 and 5, the end of the brake electrode 10, therefore, may not penetrate into this cross-section. The best result is obtained when the end of the brake electrode is tangent to the prolongation of the inner wall of the nozzle. The brake electrode 10 shown in FIG. 6 is tangent to the circumference of the cross-section (the prolongation of the inner wall of the nozzle). Therefore, the brake electrode 10 may be arranged transversely above the nozzle. The wire shape of the electrode 10 offers the advantage that, when the voltage is applied, the ink circularly rotates around the electrode wire according to the direction of the arrow, thus taking up energy so that the ink can be more quickly withdrawn into the nozzle. The pulse frequency of the pulse generator 17 can thus be even further increased.

The FIGS. 7 and 8 illustrates the use of the ink ejection device shown in the FIGS. 1 and 2 in an ink jet printer comprising more than one nozzle. The brake electrodes 10*a* to 10*f* are shaped as wire electrodes, the tip of which extends as far as the prolongation of the inner wall of the nozzle apertures 7. The brake electrodes are mounted on an electrode holder 11, one side of which accommodates connection points (not shown) by means of which each brake electrode is connected, via an associated amplifier 15, to its own second pulse generator 16 as shown in FIG. 2. A common pressure chamber 5 with ink supply duct 4 and converter 9 is associated with all nozzles. The lead 18 connected to the converter 9 is connected to the amplifier 14 (FIG. 2).

The FIGS. 7 and 8 clearly demonstrate that an ink ejection device of this kind may have a very compact construction. The nozzle apertures 7 may be arranged comparatively near one above the other or also one adjacent the other in a manner not shown, so that a very high printing quality is obtained for the mosaic-like character to be printed.

What is claimed is:

1. An ink jet printer, comprising at least one nozzle which is connected, via a pressure chamber, to an ink supply duct, said pressure chamber comprising a wall which can be moved, by means of an electrodemechanical converter, in order to realize droplet-like ejection of ink from the nozzle, characterized in that the converter (9) is adapted to vibrate continuously during operation, a brake electrode (10) being arranged just in front of the nozzle aperture (7), it being possible to apply a voltage to said brake electrode as desired, the arrangement being such that when the voltage is switched off, a droplet is ejected, whilst when the voltage is switched on, the emerging droplet is intercepted, braked and withdrawn into the nozzle (2).

2. An ink jet printer as claimed in claim 1, comprising two or more nozzles, characterized in that all nozzles (2*a* to 2*f*) have a common converter (9) and a common ink supply duct (4), each nozzle (2*a* to 2*f*) separately having associated with it a brake electrode (10*a* to 10*f*) with a second pulse generator (16), each second pulse generator (16) being separately controllable as desired in dependence of the common first pulse generator (17).

3. An ink jet printer as claimed in claim 1, characterized in that the converter (9) is a piezo-ceramic converter.

4. An ink jet printer as claimed in claim 1, characterized in that a first pulse generator (17) is associated with the converter (9), a second pulse generator (16) which can be controlled in dependence of the first pulse generator (17) being associated with the brake electrode (10).

5. An ink jet printer as claimed in claim 1 or 4, characterized in that the brake electrode (10) is shaped as a wire and is arranged perpendicularly to the ejection direction of the ink droplet (13) so that its surface is tangent to the prolongation of the inner wall of the nozzle aperture (7).

6. An ink jet printer as claimed in claim 1 or 4, characterized in that the end of the brake electrode (10) reaches as far as the prolongation of the inner wall of the nozzle aperture (7).

7. An ink jet printer as claimed in claim 6, characterized in that the brake electrode (10) extends at angle with respect to the ejection direction of the ink droplet (13).

* * * * *